Sept. 15, 1925.

L. L. DOWNS 1,554,071

POTATO HOLDING RECEPTACLE

Filed April 17, 1924

WITNESSES
William P. Goebel.
Robert J. Hulzizer.

INVENTOR
Lewis L. Downs.
BY
ATTORNEYS

Patented Sept. 15, 1925.

1,554,071

UNITED STATES PATENT OFFICE.

LEWIS L. DOWNS, OF RIVERHEAD, NEW YORK.

POTATO-HOLDING RECEPTACLE.

Application filed April 17, 1924. Serial No. 707,231.

*To all whom it may concern:*

Be it known that I, LEWIS L. DOWNS, a citizen of the United States and a resident of Riverhead, in the county of Suffolk and State of New York, have invented a new and Improved Potato-Holding Receptacle, of which the following is a full, clear, and exact description.

This invention relates to a receptacle for holding potatoes, and has for an object the provision of a simple, efficient, strong, economically manufactured receptacle for holding potatoes in a definite position conveniently at hand to a person who is cutting up potatoes for seeding purposes.

Another object concerns the provision of a simple and efficient means in connection with a receptacle whereby the potatoes in the receptacle will always be disposed in the most convenient position to the hand of the person cutting them.

The invention is illustrated in the drawings, of which—

Figure 1:
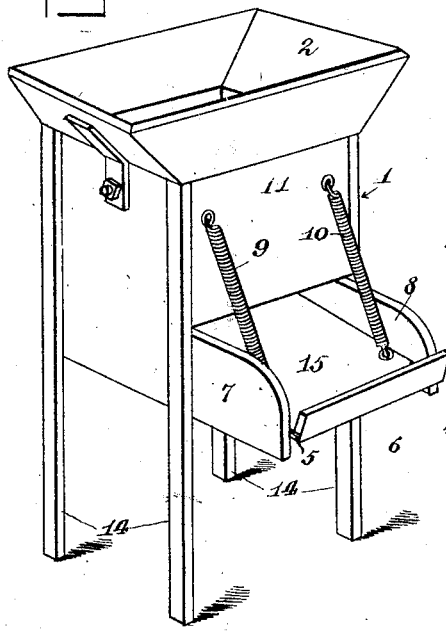
Figure 1 is a perspective view of the device.
Figure 3:
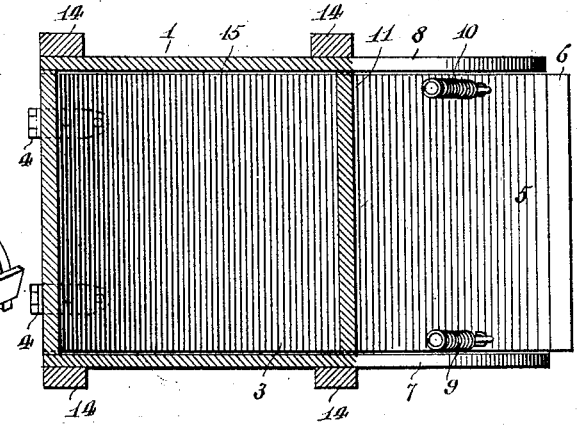
Fig. 3 is a horizontal section taken on the line 3—3 of Fig. 2.
Figure 2:
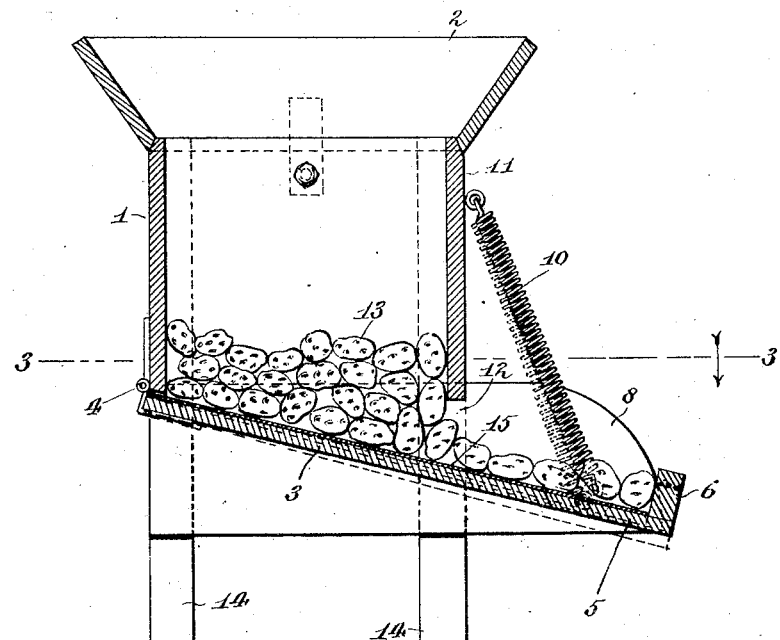
Fig. 2 is a vertical section.

The form of the invention shown in the drawings is a preferred form, although it is understood that modifications in the construction and arrangement of the parts and in the character of the materials used may be adopted without departing from the spirit of the invention as set forth in the appended claims.

In a general contemplation of the invention it is desired to associate it with a person who is, for instance, seated at the task of cutting up potatoes for seeding purposes. In such a task it is desirable that the potatoes be most readily convenient to his hand, whereby time and considerable loss of motion is saved. At the same time it is desirable to have a receptacle which will hold a sufficient quantity of potatoes to enable the person cutting them up to be seated a considerable length of time without having to refill the receptacle.

The invention which I have developed comprises a hopper of ample proportions which, at its bottom at one side, is provided with an opening through which potatoes pass on to a shelf which extends laterally from the bottom of the hopper toward the operator. This shelf is really an extension of the bottom of the hopper, which is pivoted, and the free end of which is supported by a suitable spring which tends to hold it in a normal position and maintain a certain normal size of opening in the bottom of the hopper. However, when the potatoes seem to become clogged in the opening, the forward end of the pivoted bottom can be depressed to enlarge the opening, whereby the jamming of the potatoes can be cleared to permit them to roll down to the end of the tray. In this way there is always at hand for the operator a convenient supply of potatoes so that he does not have to bend down into a big basket as is usually the case, and waste time and motion.

As shown in the drawings, a preferred form of the invention comprises a rectangular hopper 1, of ample proportions, provided with a flared top 2. The hopper is provided with a bottom 3 pivoted at 4 and has a tray portion such as 5 extending forwardly beyond the sides of the hopper to form an integral part of the bottom. This tray, preferably, is provided with an end flange 6, and side walls such as 7 and 8 are disposed on each side of the tray beyond the sides of the hopper or receptacle, these side walls, however, not being movable with the bottom. Springs such as 9 and 10, connected respectively to the hopper and to the tray, tend to hold the tray in a normal position. Between the side wall 11 of the hopper and the bottom an opening such as 12 is formed through which potatoes 13 in the hopper are adapted to pass down on to the tray, where they are most conveniently disposed with respect to the hand of the operator. If, as shown in the drawings, a jam sometimes occurs to prevent the potatoes 13 rolling down on to the tray, a depression of the end of the tray against the action of the springs will enlarge said opening 12 to remove the jam, whereupon the potatoes will roll down. In this manner a sufficient but not too great quantity of potatoes can always be found at hand on the tray. Whenever the operator desires more potatoes he merely slightly depresses the tray for an instant to receive such an additional supply.

The hopper or receptacle is generally provided with suitable legs such as 14 so that the hopper and the tray can be disposed at the proper height.

The pivoted bottom 3 of the hopper is preferably covered with a metallic plate such as 15 so that the potatoes will more readily slide down on to the tray 5 in a single layer to be more readily available to the hand of the operator, whereas if the potatoes contacted with the wood of the bottom they would not so readily move down into the proper position.

What I claim is:—

1. A potato holding receptacle, comprising a hopper, a bottom for said hopper pivoted to the bottom of one of the walls thereof, said bottom having a portion in the form of a tray extending beyond the opposite wall of the hopper, a normal opening being maintained between the bottom and said opposite wall for the passage of material therethrough, and resilient means connecting the hopper to the bottom to resist any enlargement of said opening.

2. A potato holding receptacle, which comprises a hopper, a bottom wall pivoted at one end to said hopper and disposed forwardly and downwardly at an angle with respect to the opposite wall to form an opening between itself and said wall, and spring means connecting the hopper to said movable bottom whereby the free end of the bottom can be depressed to enlarge the opening, the free end of the bottom provided with a flange and extending beyond the walls of the hopper to form a tray to receive a limited supply of material from the hopper.

LEWIS L. DOWNS.